Figure 1:
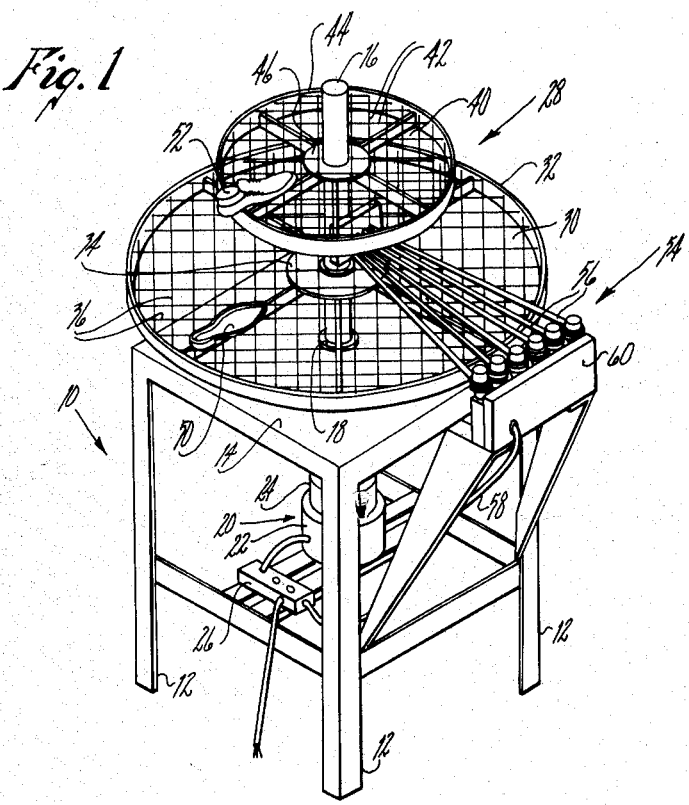

June 14, 1966 M. S. WERMAN 3,256,420
APPARATUS FOR THE HEAT ACTIVATION OF ADHESIVES
ON SHOE COMPONENTS OR THE LIKE
Filed Nov. 14, 1963

INVENTOR.
MARTIN S. WERMAN
BY
McCormick, Paulding & Huber
ATTORNEYS

United States Patent Office 3,256,420
Patented June 14, 1966

3,256,420
APPARATUS FOR THE HEAT ACTIVATION OF ADHESIVES ON SHOE COMPONENTS OR THE LIKE
Martin S. Werman, 9 Cherry Hill, Norwich, Conn.
Filed Nov. 14, 1963, Ser. No. 323,696
6 Claims. (Cl. 219—215)

This invention relates generally to the adhesive assembly of shoe components or the like and, more particularly, to apparatus for activating adhesives applied to such components by the use of high intensity radiation heat.

It has become a conventional practice to accomplish the permanent assembly of shoe components and the like with the application of adhesives requiring heat activation and apparatus has been provided for supporting the components and for applying heat to adhesives spread in layers thereon. Such apparatus has been generally satisfactory in operation but certain serious disadvantages and problems have been encountered.

With regard particularly to shoe components and the adhesive assembly thereof, the apparatus referred to has generally comprised an oven including a heat source, conventionally in the form of "cal-rods," and an operator has placed shoe components in the oven and removed the same successively in accordance with his ability to perform a subsequent operation as, for example, the assembly and placement of the components in a press. Thus, a "slow operator" may find that the adhesive and shoe components are overheated such that a sole may soften and conform to the slightest irregularity in an upper. The "fast operator," on the other hand, may assemble shoes with underheated adhesive and the bond between components may be substandard at least over a period of wear if not initially.

Still further, the application of heat in known apparatus is such that a high degree of penetration is encountered with the result that selectivity of application is limited if not impossible of achievement. Thus, even with an abundance of care and control over the "slow" and "fast" operator, heating of the shoe components themselves may be encountered in substantially the same degree as the adhesive layer thereon. This of course entails the disadvantage of sole deformation, as mentioned above, as well as other undesirable results.

It is the general object of the present invention to provide an improved apparatus for the heat activation of adhesives on shoe components or the like wherein the application of heat is controlled independently of an operator whereby to provide for efficient activation of adhesives and a highly effective bond between components in all cases.

A further object of the invention resides in the provision of apparatus of the type mentioned wherein high intensity radiation is employed in an "infrared range" with nominal penetration capability, heating of the shoe components or the like thus being avoided.

A still further object of the invention resides in the provision of apparatus of the type referred to wherein adhesive on shoe components or the like is heated more rapidly than has heretofore been possible, and wherein the curing of the adhesive, as in a press, is accomplished more rapidly than has heretofore been possible.

The drawing shows preferred embodiments of the invention and such embodiments will be described, but it will be understood that various changes may be made from the constructions disclosed, and that the drawing and description are not to be construed as defining or limiting the scope of the invention, the claims forming a part of this specification being relied upon for that purpose.

Figure 2:
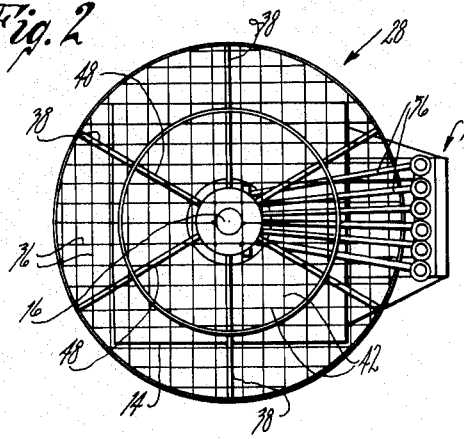
Figure 3:
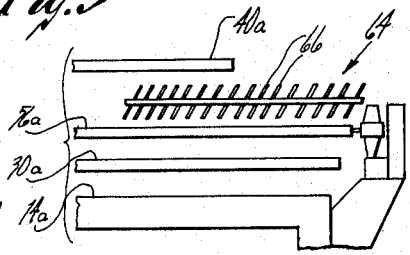

Of the drawings:
FIG. 1 is a perspective view of an apparatus constructed in accordance with the present invention;
FIG. 2 is a top view of the apparatus of FIG. 1 shown in partially schematic form; and
FIG. 3 is a somewhat schematic fragmentary vertical section showing a modified form of the apparatus.

Generally speaking, the apparatus of the present invention comprises a supporting and transporting device adapted to accommodate a plurality of shoe components or the like at one time, the components having thereon layers of adhesive requiring heat activation prior to component assembly. The said device includes a movable means which is engageable with and which is adapted to hold the components and a power operated mechanism is associated with said means. Movement of the component holding means as effected by the power operated mechanism occurs such that shoe components engaged thereby are transported through a closed-loop path, the path preferably being circular but alternatively taking other configurations within the scope of the invention. At least a portion of the path of movement of the shoe components constitutes a working station whereat the components are transported at a substantially constant rate of movement. Heating means at the working station serve to activate the adhesive on the shoe components or the like in movement of the components through the station. The said heating means are adapted to apply high intensity radiation with a nominal penetration capability and efficient heating and activation of the adhesive thus occurs with a minimum heating of the shoe components.

More specifically, and referring particularly to FIG. 1, the apparatus of the present invention comprises a frame 10 having legs 12, 12 and a tablelike top 14. A vertical shaft 16 is suitably journaled in the top 14 at 18 and extends therebeneath to a power operated mechanism 20. The mechanism 20 may obviously vary widely in form, but is shown as comprising an electric motor 22 driving a variable speed device 24 in turn connected in driving relationship with the shaft 16. A suitable switch or control means for the motor is shown at 26.

A means for engaging and supporting shoe components or the like is shown disposed above the table top 14 as indicated generally at 28. Said means, in the presently preferred form, includes a first or lower rotatable turntable 30 having a rim 32 and a central support member 34. The central support member 34 is connected with the vertical drive shaft 16 and has inner end portions of shoe component supporting means 36, 36 attached thereto. Said supporting means are preferably characterized by a rapid heat dissipation capability and in the embodiment shown comprise fine wire members attached at their outer ends to the rim 32. Radially extending supporting members 38, 38 may also be provided to add rigidity to the turntable and there may be six of said members in circumaxially spaced relationship as best shown in FIG. 2.

A second or upper turntable 40 may be constructed in substantially the same manner as the turntable 30 but is preferably somewhat smaller in diameter as shown. Fine wire members 42, 42 are adapted to support shoe components and extend between a rim 44 and a central support member 46 connected with the drive shaft 16. Radial support members may be provided at 48, 48 for added rigidity, as best shown in FIG. 2.

From the foregoing it will be apparent that the shaft 16 can serve to rotatably drive the turntables 30 and 40, and in the embodiment shown rotation occurs in a counterclockwise direction. Shoe components or the like may be placed upon the turntables for heat activation of adhesives thereon as indicated at 50 and 52. The reference numeral 50 designates a sole placed upon the first or lower turntable 30 and which has disposed upon an upper surface thereof a layer of adhesive requiring heat activation. The reference numeral 52 designates a shoe upper mounted upon a "last" and placed upon the upper turntable 40. The upper 52 may have disposed upon its undersurface a layer of adhesive also requiring heat activation.

Heating means for activating adhesive on shoe components such as the sole 50 and the upper 52 are indicated generally at 54 at a working station which may be defined as including vertically projected zones or areas disposed above and below the said heating means. In accordance with the presently preferred practice, the heating means provides high intensity radiation with low penetration capability and includes an infrared heat source. The said heat source is shown as comprising a bank of six elongated quartz lamps 56, 56 which are arranged generally radially as best illustrated in FIG. 2. The quartz lamps 56, 56 are spaced above the turntable 30 and beneath the turntable 40 so as to allow for the passage of the shoe components such as the sole 50 therebeneath and to provide for heating of the upper surface thereof and the lower surfaces of shoe components such as the upper 52. Suitable support means at inner and outer ends of the quartz lamps together with electrical connections therefor are indicated generally at 60, and the latter is connected with the aforementioned control box 26 by means of an electrical conductor 58. In accordance with the presently preferred practice, the outer support and connecting means 60 for the quartz lamps includes a means for varying the output of at least one of the lamps. In the embodiment shown, the said means takes the form of a voltage varying means such as a variable transformer disposed within the support means 60 and which is operable to vary the heat output of two of the quartz lamps 56, 56.

As will be apparent, precise control over the heating of adhesives on shoe components can be exercised with the apparatus shown. With the shaft 16 rotating at a constant speed the shoe components such as the sole 50 and the upper 52 pass through the working station or zone at a constant rate of movement. The amount of heat applied to the adhesive layers can be varied by adjusting the output of the two quartz lamps 56, 56 as mentioned above; but once established for a given condition the heat added to adhesive on each component passing through the working station will remain a constant, this irrespective of any action taken by the operator of the apparatus. Such an operator, who would ordinarily stand on the side of the apparatus opposite the heating means 54, can both load and unload shoe components placing those removed from the apparatus in conventional presses in assembled relationship. If he is a "fast operator" the number of components on the apparatus may be increased but there will be no change in the amount of heat added to the adhesive layers in the apparatus. Conversely, a "slow operator" may have less components on the apparatus, but here again the amount of heat added to the adhesive on the components will remain a constant.

For purposes of illustration, a specific example of operation of the apparatus may be considered. In such example, it should be noted that the shoe uppers such as the upper 52 were constructed of leather while the soles were formed of polyvinyl chloride. The adhesive employed on both the soles and uppers was a urethane type as for example United Shoe Machinery No. 300 or 301 adhesive. The activation temperature of such adhesive falls in the neighborhood of 160° F.

With the foregoing materials in use, the apparatus of the present invention was provided with six General Electric Company No. 1000 T-3 quartz lamps. These lamps provided a heat source temperature of approximately 4000° F. and the shoe components were moved through the working station or zone in approximately twelve seconds. The temperature of the adhesive on the soles such as the sole 50 was found to be approximately 180° F. and the temperature of the adhesive on the uppers, such as the upper 52, was found to be approximately 95° F. Heating of both adhesive layers above the activation temperature in such an arrangement is found to be unnecessary and, with the degree of heating accomplished, an excellent bond was obtained between the soles and uppers in all cases.

Still further, and with regard to so-called "one way adhesives," it is to be noted that an activation temperature as high as 350° F. may be required. Such adhesives may be applied to only one component and, the apparatus of the present invention has been found suitable for use in such a manufacturing operation. The high intensity heat provided results in heating of the adhesive to the desired high temperature and yet the low penetration characteristic of the infrared heat source avoids softening and deformation of the shoe components.

In FIG. 3 there is shown a modified form of the apparatus wherein a lower or first turntable 30a may be substantially identical with the turntable 30 described above. An upper turntable 40a may correspond identically with the aforementioned turntable 40 as is the case with the quartz lamps 56a, 56a and the aforementioned quartz lamps 56, 56. In this form of the invention, however, departure from the foregoing apparatus is to be noted in the provision of a heat limiting and reflecting means 64. The said means may vary widely in form but is shown somewhat schematically as comprising a series of louvers or shields 66, 66. Said louvers or shields 66, 66 are disposed above the quartz lamps 56a, 56a and between said lamps and the upper turntable 40a. Further, the said louvers or shields are inclined and are preferably adapted for adjustment as to their inclination so as to reflect heat downwardly toward the lower turntable and soles. Still further, it will be seen that the louvers or shields 66, 66 serve to limit the amount of heat directed upwardly toward uppers or other shoe components disposed upon the upper turntable 40a. As will be apparent, the means 64 thus serves to regulate the relative degree or amount of heating achieved with respect to adhesive on shoe components on the upper and lower turntables. Such control feature may be desirable and even necessary when certain specific types of materials are employed in the manufacture of soles and uppers, and when certain types of adhesives are utilized.

Finally, it is to be observed that several secondary advantages are achieved with the apparatus of the present invention over and above the principal advantage of highly efficient adhesive activation. The operator of the apparatus, as mentioned above, preferably stands on the side thereof opposite the heating means 54. He is thus at a substantial distance from the heating means and high intensity heat can be employed without discomfort on the part of the operator. The rapid heat dissipation capability of the fine wire members 36, 36 and 42, 42 is also an important feature particularly with regard to the machine operator. When the turntable rotates beyond the working station the wires cool very rapidly and as they approach the operator's station sufficient heat dissipation has occurred to enable the operator to remove shoe components without risking burns as might otherwise occur with inadvertent or accidental contact with the wires.

Still further with regard to the operator, it is to be observed that a single operator can perform the functions of loading, unloading, and placing assembled shoes in a press which may be located adjacent the apparatus of the invention. In contradistinction, straight line systems wherein conveyors may pass through an oven, require at least two operators for the necessarily separate and independent functions of loading and unloading shoe components.

Finally, it is to be noted that the high intensity radiation with low penetration characteristics provides an advantage in the reduction of curing time of the adhesive. Due to the absence of substantial heating of the shoe components themselves the adhesive is cooled by conduction thereto in presses much more rapidly than has heretofore been possible.

The invention claimed is:

1. In apparatus for the heat activation of adhesives on shoe components or the like, the combination of a first substantially horizontal rotatable turntable adapted to accommodate a plurality of shoe components or the like on its upper surface in circumaxially spaced relationship, a second substantially horizontal rotatable turntable disposed above and in spaced relationship with said first turntable and adapted also to accommodate a plurality of shoe components or the like on its upper surface in circumaxially spaced relationship, a power operated mechanism connectible with said turntable and operable to rotate the same whereby bodily to transport shoe components or the like in succession and at a substantially constant rate of movement past a working station, and an infrared heating means disposed at said working station between and in spaced relationship with said first and second turntables and operable to activate adhesive on shoe components or the like in movement of the same past the working station.

2. The combination in apparatus for the heat activation of adhesives as set forth in claim 1 wherein said heating means includes a plurality of quartz lamps arranged adjacent the paths of movement of the shoe components at said working station.

3. The combination in apparatus for the heat activation of adhesives as set forth in claim 2, wherein at least one of said quartz lamps has associated therewith a means for varying the heat output thereof.

4. The combination in apparatus for the heat activation of adhesives as set forth in claim 1 wherein each of said turntables comprises a plurality of fine wire members arranged in spaced relationship to support shoe components or the like.

5. The combination in apparatus for the heat activation of adhesives as set forth in claim 3 and including means disposed between said quartz lamps and said second turntable, said means serving to reflect heat downwardly and to limit upward heat radiation whereby to provide for a lesser degree of heating of shoe components on said second turntable as compared with components on said first turntable.

6. The combination in apparatus for the heat activation of adhesives as set forth in claim 5 wherein said reflecting and limiting means is adjustable as to both its heat reflecting and heat limiting functions.

References Cited by the Examiner

UNITED STATES PATENTS

| 1,085,153 | 1/1914 | Moyer | 263—7 |
| 1,093,664 | 4/1914 | Verbeyst | 263—7 |
| 2,325,086 | 7/1943 | Vore | 219—352 X |
| 2,662,964 | 12/1953 | Simms | 12—1 X |
| 2,694,131 | 11/1954 | Carson | 263—7 X |
| 2,844,699 | 7/1958 | Miskella | 219—354 X |

FOREIGN PATENTS 1,043,145　11/1958　Germany.

JORDAN FRANKLIN, *Primary Examiner.*

P. D. LAWSON, *Assistant Examiner.*